3,355,572
COMPOSITE ELECTRICALLY HEATED
TUBING PRODUCT
Albert E. Chrow, Chagrin Falls, Ohio, assignor to Samuel
Moore and Company, Mantua, Ohio, a corporation of
Ohio
Filed July 1, 1964, Ser. No. 379,638
3 Claims. (Cl. 219—301)

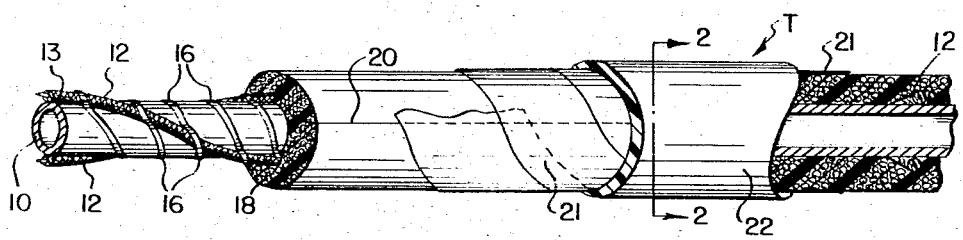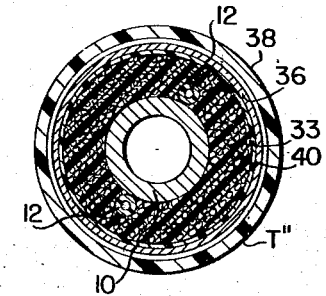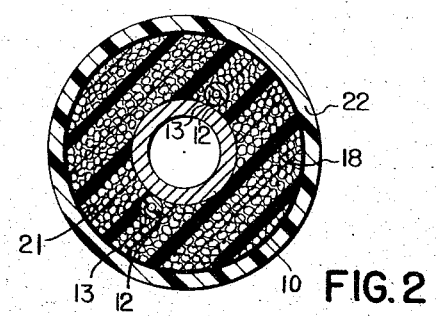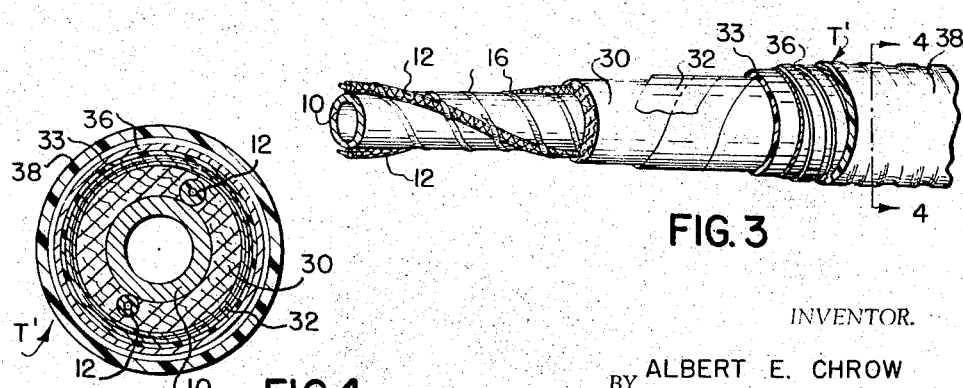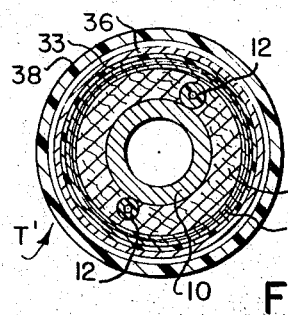

This invention relates in general to composite tubing, and more particularly to a composite tubing construction which is adapted for use in conveying a fluid, either liquid or gas, from one point to another, while maintaining the temperature of the conveyed fluid substantially constant throughout the length of the tubing.

This type of tubing presently finds its principal use in the chemical processing and petroleum refining industries, and is used, for example, for conveying a sample of fluid from a process line or a reaction vessel to an automatic instrument, such as a continuous sampling instrument, for example a chromatograph or infra-red spectrograph. Samples of the fluid taken under these conditions generally should be maintained at a relatively elevated temperature because the viscosity of the fluid must be kept as low as possible. Moreover, in the case of a gas sample being transmitted, the gaseous sample must not be permitted to condense.

In the past, such sampling tubing usually has been custom made for a particular installation, but such tubing has not been uniform in construction and operating characteristics, and has not been completely satisfactory.

The present invention provides a composite tubing or sampling line bundle which may be mass produced, which may be readily installed, which is of uniform construction from one end thereof to the other end and will therefore provide uniform and accurate results from the use of the tubing. The invention also provides a tubing or sampling line bundle which is economical to use and which provides for precise control, within a relatively narrow range, of the temperature of the fluid flowing through the tubing.

Briefly, the tubing product in accordance with the instant invention comprises a preferably deformable sampling tube about which is disposed in engagement therewith electrical heating means, such as electrical heating wire. The tube and electrical wire in turn is covered with thermo-barrier of flexible material, which in turn is preferably wrapped with a polymeric tape and then is coated with a flexible sheath of plastic material to form the composite tubing product.

Accordingly, an object of the invention is to provide a novel composite tubing product.

Another object of the present invention is to provide a composite tubing which is adapted for use as sampling tubing, and which is relatively easy to bend to the desired configuration for extending from the point of sampling to instrumentation, for handling the samples taken by the tubing, and wherein the tubing is of a uniform construction throughout its length, for providing consistent and accurate results from the sample taken.

Another object of the invention is to provide a novel composite tubing for sampling fluids comprising a sampling line with electrical heating means disposed in juxtaposed relation with the sampling line, and with a cellular plastic thermo-barrier encompassing the line and electrical heating means, and a flexible sheath of plastic material encompassing the thermo-barrier and the sampling line.

A more specific object of the invention is to provide a novel composite tubing for sampling fluids comprising, a generally linearly extending bendable sampling line, a plurality of solid electrical heating wires disposed in intimate engagement with the sampling line, and entwining thereabout in slow spirals, a slit tubular thermo-barrier of a cured expanded plastic foam material, such as polyurethane foam, encompassing said sampling line and associated heating wires, with the slit foam tube being wrapped with a polymeric film tape disposed in overlapping relationship about said foam tube, and an outer sheath of polymeric plastic (e.g. polyvinyl chloride plastic) covering the polymeric tape.

Another specific object of the invention is to provide a novel composite tubing for sampling fluids, comprising, a generally linearly extending bendable sampling line, a plurality of solid electrical heating wires disposed in intimate engagement with the sampling line, and entwining thereabout in slow spirals, a layer of flexible fibrous filler and insulating material encompassing the sampling line and heating wires to give a symmetrical configuration to the bundle, a thermo-barrier layer of flexible insulating tape wound about said filler material in overlapping relation, a flexible metallic protective cover layer encompassing the taped bundle with a layer of flexible polymeric plastic disposed between the metallic cover and the insulating tape, and an outer sheath of flexible polymeric plastic covering the metallic protective cover.

Other objects and advantages of the invention will be apparent from the following description taken in conjunction with the accompanying drawings wherein:

FIG. 1 is a partially sectioned and partially cut-away view of a composite tubing product made in accordance with the instant invention;

FIG. 2 is an enlarged transverse cross-sectional view taken generally along the plane of line 2—2 of FIG. 1, looking in the direction of the arrows;

FIG. 3 is a partially cut-away fragmentary view of another embodiment of the tubing of the invention including a flexible armor layer;

FIG. 4 is an enlarged transverse cross-sectional view taken generally along the plane of line 4—4 of FIG. 3, looking in the direction of the arrows; and FIG. 5 is an enlarged transverse cross-sectional view of a further embodiment of tubing including a flexible armor layer.

Referring now again to the drawings, there is shown a piece of composite tubing T comprising a sampling or control line or tube 10 with electrical heating means or electrical heating wires 12 wrapped in spiral fashion about the sampling line 10 and in intimate contact therewith.

The sampling line 10 may be formed, for instance, of metallic material such as stainless steel, with the line having a wall thickness of for instance .035 inch. The heating wires 12 are of conventional type and for instance, a nickel-chromium wire insulated with a polymeric tape covered with a single fiberglass braid 13. The polymeric insulating tape on the electrical wires may be of the known termoplastic material polyetetrofluorethylene (commonly known as Teflon). The fiberglass braid on the electrical wires gives added mechanical protection to the wires.

The wires 12 are wound in a slow spiral about the sample tube 10 and are maintained in diametrically opposite condition with respect to the longitudinal axis of the tubing 10. In order to insure the maintenance of the two electrical heating elements in said diametrically opposed condition, the wires are preferably wrapped with binder strands 16. Binder strands 16 may be comprised of one continuous strand of nylon fiber or the like wrapped in spiral relation about tube 10 and associated wires 12.

Surrounding the sampling tube and associated electrical heating wires there is provided a comparatively thick thermo-barrier layer 18 of flexible cellular plastic material, such as polyurethane foam, which is preferably preformed into tubular configuration having an aperture running therethrough for receiving therein the sampling line and associated heating means. The tubular foam is preferably slit along one side thereof as at 20, to permit ready entry of the sampling line and heating means into encompassed relation with respect to the foam layer. While a preformed cellular foam layer is preferred, such layer could be made by "foaming-in-place" during continuous manfacture of the product. The wall thickness of the foam thermo-barrier layer is preferably approximately ¼ inch.

Wrapped about the layer of plastic foam material 18 is a wrap of polymeric film tape 21, with the tape wound about the plastic material with about a 25% overlap in the embodiment illustrated. An excellent material for the tape is found to be Mylar from the E. I. DuPont de Nemours and Company, which material is a polyethylene terephthalate polyester film of tough, strong characteristics, and which is impervious to moisture. Such polyester is of very high molecular weight (about 10,000) and formed from the reaction of equal moles of ethylene glycol and terephthalic acid. The polymeric tape may be of 1 mil thickness.

An outer jacket or sheath of flexible plastic material 22 is then provided in encompassing relationship to the taped thermo-barrier layer, to add to the damage and moisture resistance of the composite tubing, and prevent weathering of the composite tubing. This outer jacket may be formed of any suitable plastic material, such as for instance the polyvinyl chlorides, polyethylenes, polyurethanes, neoprenes, or fluoro carbons (e.g. Teflon).

The composite tubing of the invention enjoys reduced cost of installation as compared to custom made structures heretofore used, and is of considerably less bulk and weight per foot as compared to such prior art installations. The tubing because of its uniformity and reliability in operation gives much more uniform and accurate results from flluid samples taken thereby.

The product is capable with the 14 A.W.G.-solid heating wire, of giving approximately 9.25 watts per foot in ambient temperature ranges between approximately —20° F. and 100° F., and is capable of maintaining a temperature differential of up to about 200° F. Generally, the wattages can be increased for lower ambient temperatures. However, it has been found that the ambient temperature should be as low as possible within said range for higher wattages, since there is a definite maximum ambient temperature limitation on the wattages per foot for different sizes of heating wire and various wattage ranges. The reason for ambient temperature limitations is that it is not desirable to expose the polyurethane foam thermo-barrier layer 18 to temperatures higher than about 300° F. The electrical heating means, however, gives precise control over the temperatures maintained at the sampling tube.

While the sampling lines have been referred to as being metallic, it will be understood that such lines might be of non-metallic materials and formed for instance of "Teflon" or nylon.

Referring now to FIGS. 3 and 4, there is illustrated another embodiment of the composite tubing. In this embodiment T', there may be provided a sampling line 10 and heating wires 12 in a generally similar arrangement as that of FIGS. 1 and 2. However, such sampling line and heating wires may be encompassed by a layer 30 of filler material which may be formed of fibrous material, such as for instance jute, or other filamentary material, and which may be somewhat heat insulating. Such filler layer 30 provides a generally symmetrical configuration to the bundle and also provides a cushion for the bundle. Wrapped about layer 30 in overlapped spiral relation is a thermo-barrier layer 32 of laminated asbestos-polyester tape. The aforementioned Mylar may be laminated with asbestos in a known manner to provide such insulating tape. The tape is preferably wrapped sufficiently about filler layer 30 to provide a nominal buildup of approximately 3/16 inch thickness of filler and tape. Covering the taped bundle is a layer 33 of preferably extruded flexible plastic, such as the aforementioned polyvinyl chloride, which provides a protective and moisture resistant barrier for the taped bundle.

Covering such plastic encompassed bundle is a flexible metallic protective layer 36, such as BX armor, to give a high strength, crush resistant armored tubing. A flexible sheath 38 of flexible plastic is then preferably extruded over the flexible armored layer 36. Sheath 38 may be generally similar to the sheath 22 of the first described embodiment, giving corrosion and moisture resistance to the armored layer. Tape layer 32 also prevents any electro-galvanic action between the sampling line and the metallic armor 36. Moreover, the armor layer 36 materially increases the "pull" and "crush" resistance of the composite tubing, with the plastic sheath 38 mechanically interlocking with the interstices or corrugations in the armor layer 36.

Referring now to FIG 5, there is illustrated a further embodiment of tubing bundle T" including a flexible armor layer, but which uses a thermo-barrier layer 40 of the aforementioned flexible cellular plastic material, such as polyurethane foam, instead of the filler layer 30 and tape layer 32 of the FIGS. 3 and 4 embodiment. In other respects, the FIG. 5 bundle is generally similar to that of FIGS. 3 and 4.

From the foregoing description and accompanying drawings it will be seen that the invention provides a novel composite tubing comprising, a sampling line having electrical heating means disposed thereabout in generally spiral relation and about which is provided an insulating layer of flexible cellular plastic material or insulating tape material, which in turn is jacketed with an outer flexible plastic sheath, which may include flexible armor, for protecting the tubing, and wherein the tubing may be readily installed and handled in a much more expeditious, convenient and inexpensive manner as compared to custom made arrangements.

The terms and expressions which has been used are used as terms of description and not of limitation, and there is no intention in the use of such terms and expressions, of excluding any equivalents of any of the features shown or decsribed, or portions thereof, and it is recognized that various modifications are possible within the scope of the invention claimed.

I claim:

1. A composite tubing product of uniform construction throughout its length adapted for use as sampling tubing or the like comprising, a flexible sampling line means, electrical heating line means disposed exteriorly of and along such sampling line means throughout its length in heat transferring relation to said sampling line means, said heating line means being spirally wound about said sampling line means and strand means encircling said electrical heating line means and holding the latter in predetermined oriented relationship with respect to said sampling line means, a lightweight, flexible thermo-barrier layer of insulating material encompassing said line means throughout their length and providing a cushion therefor, said thermo-barrier layer comprising a pre-formed cylinder of flexible expanded polyurethane foam material having a pre-formed lengthwise extending passageway therethrough with the cylinder of foam material being slit lengthwise along one complete side thereof, a film of impervious polymeric tape wrapped about said thermo-barrier layer in underlying relation to an outer sheath, said tape comprising polyethylene terephthalate film being disposed in spirally overlapped condition about said thermo-barrier layer, and a flexible plastic sheath contiguous to and covering said thermo-barrier layer, said means, thermo-barrier layer and sheath embodying a deformable tubing.

2. A composite tubing in accordance with claim 1 wherein the synthetic tape is disposed in about a 25% overlap at adjacent convolutions.

3. A composite tubing product in accordance with claim 1 wherein the wall thickness of said outer sheath is relatively thin as compared to the wall thickness of said tubular foam layer.

References Cited

UNITED STATES PATENTS

| | | | |
|---|---|---|---|
| 1,492,146 | 4/1924 | Thornton | 219—436 |
| 1,995,302 | 3/1935 | Goldstein | 219—381 X |
| 2,288,248 | 6/1942 | Long | 219—301 X |
| 2,578,280 | 12/1951 | Barnard. | |
| 2,602,764 | 7/1952 | Billingham. | |
| 2,936,792 | 5/1960 | MacCracken et al. | 138—139 X |
| 3,120,600 | 2/1964 | True | 219—538 X |
| 3,269,422 | 8/1966 | Matthews et al. | 165—136 X |

FOREIGN PATENTS

| | | |
|---|---|---|
| 847,074 | 6/1939 | France. |
| 527,759 | 10/1940 | Great Britain. |
| 82,489 | 10/1919 | Switzerland. |

ANTHONY BARTIS, *Primary Examiner.*